(12) United States Patent
Bontrager et al.

(10) Patent No.: US 6,567,069 B1
(45) Date of Patent: May 20, 2003

(54) INTEGRATED DISPLAY AND YOKE MECHANISM

(75) Inventors: Rich Bontrager, Shawnee Mission, KS (US); Saied Barakchi, Lawrence, KS (US); Tom McBride, Gardner, KS (US); Doug Henkel, Olathe, KS (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/354,746

(22) Filed: Jul. 29, 1999

Related U.S. Application Data

(60) Provisional application No. 60/110,149, filed on Nov. 25, 1998.

(51) Int. Cl.[7] ................................................ G09G 5/00
(52) U.S. Cl. ............................ 345/156; 345/7; 701/213; 244/75 R
(58) Field of Search ..................... 345/7, 156; 701/207, 701/213; 244/75 R, 184, 234, 237

(56) References Cited

U.S. PATENT DOCUMENTS

| | | | | | |
|---|---|---|---|---|---|
| 5,021,771 | A | * | 6/1991 | Lachman | 345/164 |
| 5,319,803 | A | * | 6/1994 | Allen | 455/566 |
| 5,436,638 | A | * | 7/1995 | Bolas et al. | 345/156 |
| 5,555,502 | A | * | 9/1996 | Opel | 701/36 |
| 5,666,102 | A | * | 9/1997 | Lahiff | 340/461 |
| 5,691,695 | A | * | 11/1997 | Lahiff | 340/461 |
| 5,821,935 | A | * | 10/1998 | Hartman et al. | 345/349 |
| 5,855,144 | A | * | 1/1999 | Parada | 74/552 |
| 6,009,355 | A | * | 12/1999 | Obradovich et al. | 701/1 |
| 6,065,417 | A | * | 5/2000 | Vuckovic | 114/121 |
| 6,127,969 | A | * | 10/2000 | Van Roekel | 342/357.13 |

FOREIGN PATENT DOCUMENTS

DE     4328564     *  8/1994

* cited by examiner

Primary Examiner—Bipin Shalwala
Assistant Examiner—Ricardo Osorio

(57) ABSTRACT

A yoke mounted instrument display capable of displaying information from a number of different sensors.

22 Claims, 4 Drawing Sheets

INTEGRATED DISPLAY AND YOKE MECHANISM

This application claims the benefit of U.S. Provisional Application Ser. No. 60/110,149 filed Nov. 25, 1998 of the same title, the entirety of which is incorporated herein by reference.

BACKGROUND OF THE INVENTION

The invention relates to airplane cockpits, and more particularly to control yoke mounted airplane cockpit displays.

Display space on the control panel of an aircraft is limited by the physical dimensions of the cockpit and the number of instruments displayed on the control panel is limited by the physical size of the instrument's display which must be large enough to be easily read by the crew. These control panel space constraints limit the number of instruments available on the control panel of any aircraft, from the small private airplane to the large commercial airliners. For example, current private airplanes are typically equipped with a standard avionics package that includes a pair of radios and a pair of navigation receivers. The control panel is filled with engine instrument displays, airplane control displays and navigation/voice radio displays. No room exists on the control panel for map displays, such as those that use information from a global positioning system (GPS). Although larger and carrying more instruments, commercial airliners suffer similar space constraints. Similar constraints also limit the number of instruments which can be displayed on the control panel of a land or water-based vehicle, i.e., the dash board of an automobile or a boat. In such situations display space is a premium.

Because display space is a premium, instrument panels generally do not provide space for redundancy, i.e., back-up displays for any or all flight critical instruments. Nor is space available for additional flight information. Thus, as current technology provides new information sources, for example, the GPS position information, the instrument display must compete with the existing instruments for space on the control panel. Some of the new technology products provide critical flight safety information which must somehow be provided to the crew. Additionally, pilots must routinely consult pre-flight check lists, flight charts, approach plates, and other flight information documents, while operating the aircraft. For example, during landing pilots generally prefer to have an approach plate or map in plain view for easy reference.

Examples of efforts to provide additional display space include such products as so called "lap boards." Lap boards, as described in Design U.S. Pat. No. 317,788, AVIATION LAP BOARD, are literally boards strapped to the pilot's leg which provide an extra flat surface for holding maps for reference during flight or landing. However, the pilot is forced to continually look down at the lap board to read the documents which interrupts attention to the instruments and windshield. Another example is the clip board mounted to the column of the aircraft control yoke described in each of U.S. Pat. No. 4,969,623, FLIGHT DOCUMENTS ORGANIZER and U.S. Pat. No. 5,441,229, HOLDER FOR ASSEMBLAGE OF PILOT FLIGHT CHARTS. U.S. Pat. No. 3,809,338, TIMER AND APPROACH PLATE HOLDER FOR AIRCRAFT describes such a clip board, incorporating a chronometer, which mounts by a spring clip onto the yoke column. U.S. Pat. No. 5,222,690, VEHICULAR DESK OR INFORMATION DISPLAY, describes another such clip board, incorporating a video display, which again mounts by a clamp onto the yoke column. Other clip boards are know which are designed to mount directly onto the control yoke, either as a removable attachment or as an integral part of the control yoke (no examples found). The described control column and yoke mounted clip boards provide the pilot with an easily viewable display.

Presently, pilots often temporarily mount the approach map, or another aeronautical chart or flight information document, like a recipe card on the clip board. However, while pilots need to comfortably and effectively consult these documents in a timely fashion as the need arises, such maps and documents tend to obscure other critical flight instruments and engine and fuel monitoring instruments on the control panel. Also, these documents tend to become awkward and unwieldy when too large to conveniently fit on the clip board. Some further disadvantages of control column mounted clip boards are that they are costly for many private pilots and that small aircraft manufacturers cannot provide these useful displays because their temporary nature does not allow for certification.

However, the control yoke does provide an excellent opportunity for additional instrument display space as exemplified by the installation of a clock or chronometer in the center of the control yoke. For example, see the Beech Super King Air cockpit. None of the prior art devices teach utilizing the control yoke to provide a easily viewable display which provides access to a variety of useful information. Thus, to date, the display space presented by the control yoke has not been effectively exploited by any of the prior art devices.

SUMMARY OF THE INVENTION

The present invention overcomes the display space limitations of the prior art by providing a yoke mounted instrument display capable of displaying information from a number of different sensors.

The display assembly of the present invention receives information from one or more on-board information sources. The information is processed by a navigation computer integrated into the steering mechanism of a vehicle control system; and the information is displayed on a display integrated into the steering mechanism. The on-board information sources preferably include one or more of a flight computer, one or more on-board warning systems, and one or more navigation sensors. The invention preferably displays flight safety information, navigation moving maps, terrain maps and/or other displayable information received from the flight computer or directly from the on-board information sources.

According to one aspect of the invention, a display assembly is mounted on the control mechanism, i.e., the control yoke or steering wheel, of any of an aircraft, an automobile or a boat. The display assembly includes a navigation computer integrated with the control mechanism. The navigation computer receives information from one or more information systems. The information systems are, for example, a flight computer, one or more on-board warning systems, and/or one or more navigation sensors. According to one aspect of the invention, the information systems are a database storing navigational charts and global positioning system (GPS) information received from navigation sensors. The information systems are either located elsewhere on the vehicle external to the display assembly or are integral with the display assembly.

The navigation computer has access to one or more computer programs which may be any of one or more pre-programmed computer applications resident on the navigation computer; one or more pre-programmed computer applications available through access to a pre-programmed memory device such as a magnetic or optical data storage device; or one or more computer application programmed by the user. The navigation computer executes one or more of the computer programs to generate an output signal in response to information received from one or more of the information systems. Function controls are integrated with the control mechanism and coupled to the navigation computer. The function controls are preferably one or more function control keys. According to one aspect of the invention, each of the function control keys exhibits a programmable function compatible with each different computer application. Through the function controls the operator causes the navigation computer to execute different ones of the computer applications. A visual display integrated with the control mechanism and coupled to the navigation computer receives the navigation computer's output signal and displays information useful to the vehicle operator. The display screen is preferably capable of dynamically displaying graphical and textual information. For example, in an aircraft application, the information displayed is flight safety information, navigation moving maps, terrain maps and/or other displayable information received from the flight computer. The function controls are alternatively menu choices on the display screen combined with a pointing device, such as a mouse, which is coupled interactively with the navigation computer.

According to one aspect of the invention, the display assembly optionally also includes a memory device coupled to the navigation computer. The memory device, for example, a magnetic disk memory, a compact disk memory or another suitable memory device, is preferably a read-only memory device. Memory storage devices, i.e., magnetic disks or compact disks, having stored database information or pre-programmed computer applications are inserted into the memory device and thus the stored information is made accessible to the navigation computer, either as an executable computer program or as database information usable in an executable computer program.

According to yet another aspect of the invention, the display assembly is formed integrally with the vehicle steering mechanism such that the combination steering mechanism and display assembly can be mounted on a vehicle to both steer the vehicle and display vehicle status information processed by the navigation computer.

Steering mechanisms, whether intended for an aircraft, automobile or boat, are typically formed with a central hub where the interconnection to the vehicle's control system is normally made. Whether the display assembly is formed integrally with the steering mechanism or integrated with an existing steering mechanism by being removably or fixedly attached, the display assembly is preferably positioned essentially at the center of the steering mechanism's central hub.

DETAILED DESCRIPTION OF THE INVENTION

The present invention is a yoke mounted display assembly displaying information from one or more aircraft systems and/or one or more information documents.

Figure 1:
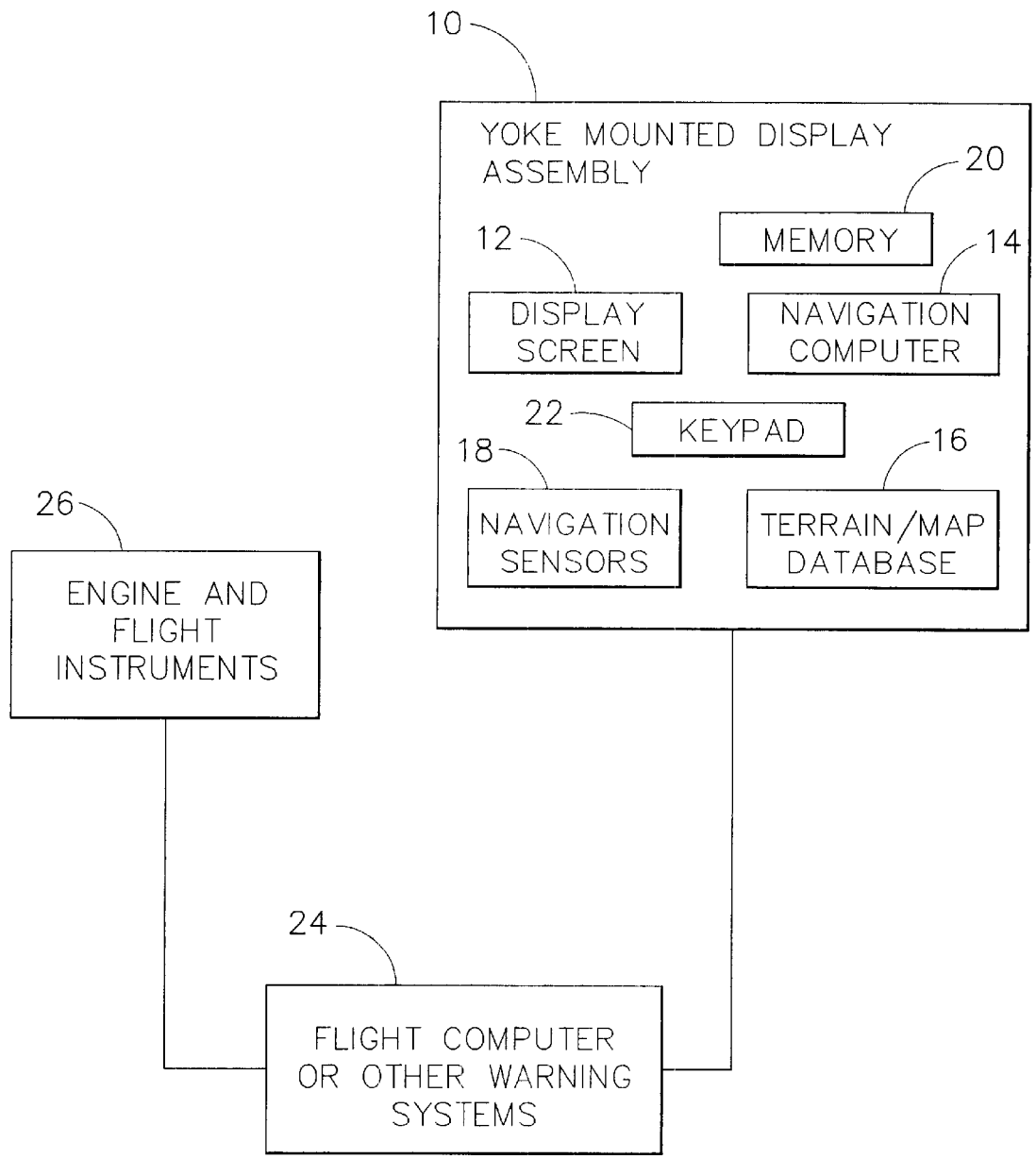
FIG. 1 is a block diagram of the components of the present invention according to one aspect of the invention.

FIG. 1 is a block diagram illustrating a yoke mounted display assembly 10 that presents information useful to the control and navigation of an aircraft or other vehicle. Display assembly 10 at least includes an integral display screen 12. Display screen 12 is preferably a flat panel display, such as a passive liquid crystal display (LCD) capable of graphically presenting flight safety information, navigation moving maps, terrain maps and other displayable information. For example, display screen 12 displays information presented by a navigation computer 14 from among navigational charts stored in a database 16 according to global positioning system (GPS) information received from navigation sensors 18. Alternatively, display screen 12 is another suitable video or computer display such as a liquid crystal display, a plasma display, or any other suitable display.

Display assembly 10 includes integral logic circuits, integral sensors and/or integral databases with external connection to remote flight control systems and sensors. For example, according to one embodiment, display assembly 10 includes, for example, integral navigation computer 14, integral terrain database 16 and integral navigation sensors 18. Each of terrain database 16 and navigation sensors 18 are coupled interactively with navigation computer 14. Display assembly 10 optionally includes a memory device 20 coupled interactively with navigation computer 14. Memory device 20 is preferably a read only memory device. Memory device 20 is any of a floppy disk drive or a compact disk-read only memory (CD-ROM) or another conventional read only memory device. Alternatively, memory device 20 is any conventional read/write memory device. A floppy disk or CD-ROM disk having information useful to the pilot stored thereon may be inserted into memory device 20 so that the information may be accessed. In an aircraft application such useful information includes, for example, electronic copies of National Ocean Survey (NOS) charts, Standard Terminal Approach (STAR) charts, Standard Instrument Departure (SID) charts, as well as Jeppesen-Sanderson instrument approach and departure plates, and other important flight information such as clearances, checklists and sectional charts as well as other database information. Display assembly 10 also includes one or more function control keys or keypad 22 or an equivalent device for interacting with navigation computer 14. Function control keys 22 are coupled to navigation computer 14 for user entry of text and commands that affect the running of software programs executing on navigation computer 14.

In an aircraft application, display assembly 10 is coupled to other aircraft systems, such as a flight computer and any on-board warning systems 24 that receive information from the aircraft's engine and flight instruments 26. Navigation computer 14 is coupled to receive information from flight computer and any on-board warning systems 24. Navigation computer 14 includes one or more resident software applications or programs for manipulating data received from flight computer and any on-board warning systems 24 and presenting the information in a useful format.

Additionally, a floppy disk or CD-ROM disk having other useful executable files and data stored thereon may be inserted into memory device 20 so that the information can be read for transfer into the memory and/or storage portion of navigation computer 14. Alternatively, software instructions for implementing additional applications or programs may be obtained by downloading the instructions from an internet site or from an electronic mail transmission or via another electronic transfer medium. The machine instructions of the software application are loaded into a memory portion of navigation computer 14 for execution by the central processing unit (CPU) portion of navigation computer 14.

One or more of navigation computer 14, terrain database 16 and navigation sensors 18 may also be externally connected to display assembly 10. For example, according to another embodiment, display assembly 10 is a "dumb" server having no on-board logic or sensors instead being externally connected to remote logic circuits, sensors and/or databases through, for example, a cable connection.

Figure 2:
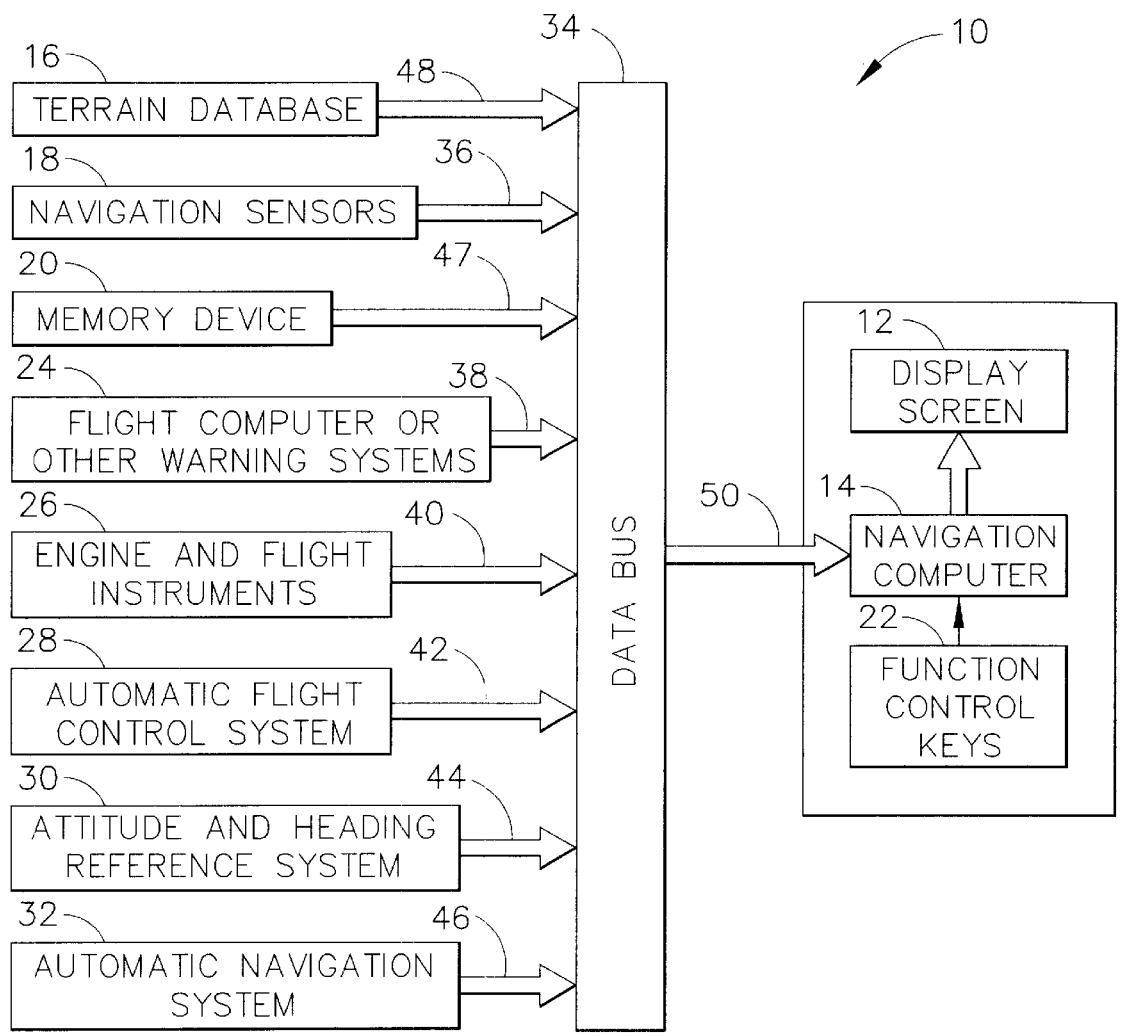
FIG. 2 is a block diagram of the components of the present invention according to another aspect of the invention.

FIG. 2 illustrates an embodiment wherein display assembly 10 includes integral display screen 12 and integral navigation computer 14 and is externally connected to at least remote terrain database 16, remote navigation sensors 18, remote memory device 20, and flight computer and any on-board warning systems 24 that again receive information from the airplane's engine and flight instruments 26. The external connection to remote terrain database 16, remote navigation sensors 18 and other on-board systems may be accomplished by any of several conventional means. For example, the data signal connection may be directly to the standard output of the sensor, through connection to a 429 avionics (ARINC429) bus (shown) which is standard on all aircraft, through a standard RS-232 computer bus, or through another proprietary data bus. Thus, display assembly 10 is capable of presenting raw information or preprocessed information available on the data bus. For example, a data cable is connected to already installed global positioning system sensors. Preferably, the data cables provide a serial link. When raw information is passed to display assembly 10, software and hardware components included within navigation computer 14 generate display information according to the received raw information. The generated display information is then presented on display screen 12.

Display assembly 10 preferably provides multiple software applications and displays information from multiple sources as shown in FIG. 2. Display assembly 10 provides redundant display of any of the information displayed on the instrument panel displays, i.e., provides backup capability to the instrument panel displays. Display assembly 10 also provides additional display space and capability for displaying information from any new information sources, for example, the GPS position information. Other useful information presented on display screen 12 includes, for example, above mentioned National Ocean Survey (NOS) charts, Standard Terminal Approach (STAR) charts, Standard Instrument Departure (SID) charts, as well as Jeppesen-Sanderson instrument approach and departure plates, and other important flight information such as clearances, checklists and sectional charts stored in database 16 or another database. Although display screen 12 can be split to display two or more applications, i.e., display information from two or more different sources at any given time, the preferred embodiment is achieved when display screen 12 displays information relevant to a single application.

Display assembly 10 is configured according to conventional methods. For example, in an aircraft application display 10 is configured generally as described in U.S. Pat. No. 4,149,148, AIRCRAFT INSTRUMENT DISPLAY SYSTEMS, which is incorporated herein by reference. In FIG. 2, the aircraft parameters to be displayed are generated by on-board aircraft systems including navigation sensors 18, flight data computer 24, engine and flight instruments 26, automatic flight control system 28, attitude and heading reference system 30, and automatic navigation system 32. Data from each of these on-board aircraft systems are transmitted to data bus 34 via digital buses 36, 38, 40, 42, 44 and 46, respectively, typically arranged to transmit 32-bit words in serial format at a bit rate on the order of 100,000 bits per second. Memory 20 is also coupled to data bus 34 via digital bus 112 and terrain database 16 is coupled to data bus 34 via digital bus 48. A mouse device (not shown), or other pointing device, is optionally connected to a serial port, or to a bus port to navigation computer 14 and signals from the mouse are conveyed to navigation computer 14 to control a cursor on display screen 12 and to select text, menu options, and graphic components displayed thereon by software programs executing on navigation computer 14.

Data are output to navigation computer 14 via digital bus 50. Flight control information transmitted over digital bus 42 includes, for example, pitch, roll and throttle control, modes of flight direction fly-up/fly-down commands, radio altitude, glide slope deviation, localizer deviation, air speed references and altitude references. Air data information transmitted via digital bus 38 includes, for example, barometer setting, pressure altitude, calibrated air speed, Mach number, true air speed, vertical speed and maximum operating speed. Inertial information transmitted via digital bus 44 includes, for example, pitch attitude, roll attitude, magnetic heading, true heading, rate of turn, lateral acceleration, normal acceleration and longitudinal acceleration. Navigation information transmitted via digital bus 46 is VOR deviation, VOR distance, VOR bearing, selected course, selected heading, cross track deviation, vertical track deviation, way point identity, distance to way point, time to way point and ground speed.

Navigation computer 14, which includes a display processor with a video card, responds to data input on bus 50. The display processor portion of navigation computer 14 generates signals in response to instructions executed by the central processing unit of navigation computer 14 that are output via an address bus and a data bus to a video encoder portion of navigation computer 14 in 16-bit words in a conventional manner as is known to those of ordinary skill in the art. Other information can be programmed as required to efficiently utilize the data and to provide good quality displays under dynamic conditions. The address bus and data bus are used to format the contents of the cells that define the field of view of display screen 12. The display processor portion has access to a pre-programmed bank of symbols which are used identically or partially in various cell locations, typically in conventional groupings to form a graphic display or numeric fonts, in a format which is clear, effective and esthetically appealing. The video encoder portion gathers and organizes the data and outputs the data to a conventional digital-to-analog converter (DAC) which drives a conventional video amplifier. The output of video amplifier portion of navigation computer 14 is displayed on display screen 12.

Figure 3:
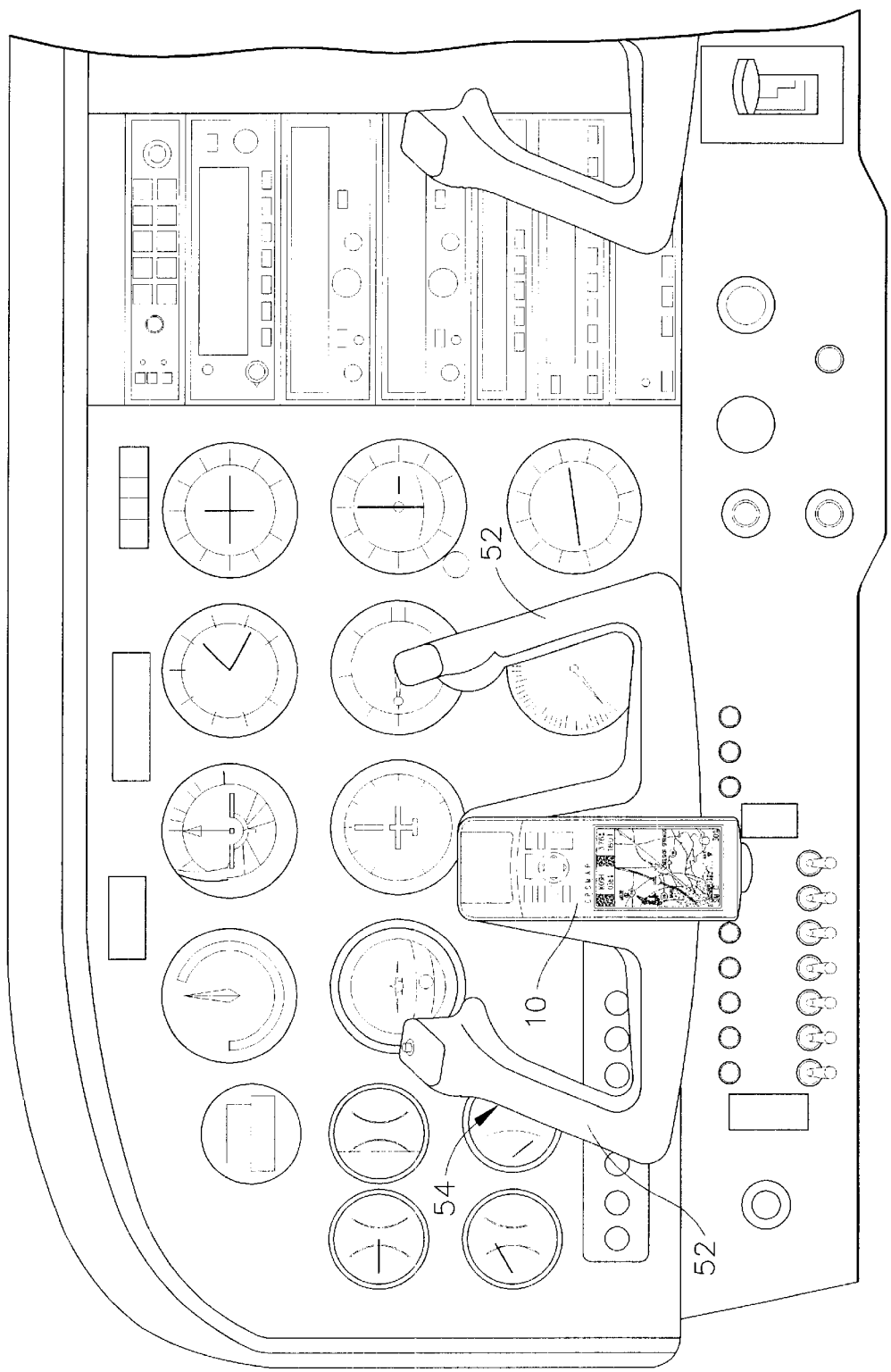
FIG. 3 is a pilot's view of the cockpit of an aircraft with a yoke assembly formed in accordance with the present invention.

FIG. 3 illustrates the integration of display assembly 10 into the center portion of the control portion 52 of a yoke assembly 54 of an aircraft. Control portion 52 includes one or more handle portions gripped by the operator of the vehicle or the pilot of the aircraft. The handles are typically formed symmetrically about and projecting outwardly from the sides of a central hub portion which attaches to the control column of yoke assembly 54. Manual manipulations of the handles imparts steering control impulses to the aircraft control surfaces through the control column of yoke assembly 54 and other intervening mechanisms. Display assembly 10 is preferably centrally located on control portion 52. Alternatively, display assembly 10 is offset relative to control portion 52, provided an essentially unobstructed view of the instrument panel is maintained. Although aircraft applications have been the primary focus of the above description of the present invention, various configurations of the device herein are equally compatible with other suitable land and marine vehicles. The device of the present invention is compatible with the control yoke of an aircraft or the steering wheel of a boat or automobile. The device of the invention is formed integrally with the aircraft control yoke or vehicle steering wheel. Alternatively, the device is removably or fixedly mounted to the vehicle control yoke or steering wheel by any means, including screws, bolts and nuts, clamps, clips, straps and/or other conventional attachment means provided the objectives of easy manipulation and essentially unobstructed view of the instrument panel are maintained.

Display assembly 10 is preferably fixed in relation to control portion 52 of yoke assembly 54 and moves with the motion of control portion 52. Thus, display assembly rotates with any rotation of control portion 52 and moves upwardly and downwardly when control portion 52 is pushed away from the pilot or pulled toward the pilot. Rotation does not seriously impact the effectiveness of display assembly 10. In an aircraft application, during operation control portion 52 rotates considerably less than the rotation associated with the steering wheel of an automobile, usually having a rotation limit of about 90°. Furthermore, in any of an aircraft, automobile or marine application, the steering control assembly, i.e., control portion 52, is generally in a fixed orientation except during an actual turning operation. Thus, display assembly 10 remains in an upright and conveniently viewable orientation except during the short interval associated with the actual turning operation. However, according to one embodiment, display assembly 10 is gimbal mounted to maintain an upright orientation. According to another embodiment, display assembly 10 includes a level sensor, for example an accelerometer, for controlling a conventional software program which rotates the display on display screen 12 relative to yoke rotation to maintain an apparent upright orientation.

Display assembly 10 may be powered by battery but is preferably powered by the vehicle's on-board power supply suitably conditioned. Connection to the vehicle power supply and remote sensors may be made via external cable directly or the power supply and/or remote sensors. Alternatively, the vehicle is pre-wired during vehicle manufacture such that power and sensor inputs are delivered directly to control portion 52 such that display assembly 10 simply plugs into the one or more connectors provided. Yoke assembly 54 also includes a hollow shaft mechanically coupled to control portion 52. Power and ground cables pass through the hollow shaft from the airplane's power supply to display assembly 10. Display assembly 10 may include a separate on/off switch to control the power but is preferably automatically activated with other on-board instruments when the vehicle is powered-up.

Figure 4:
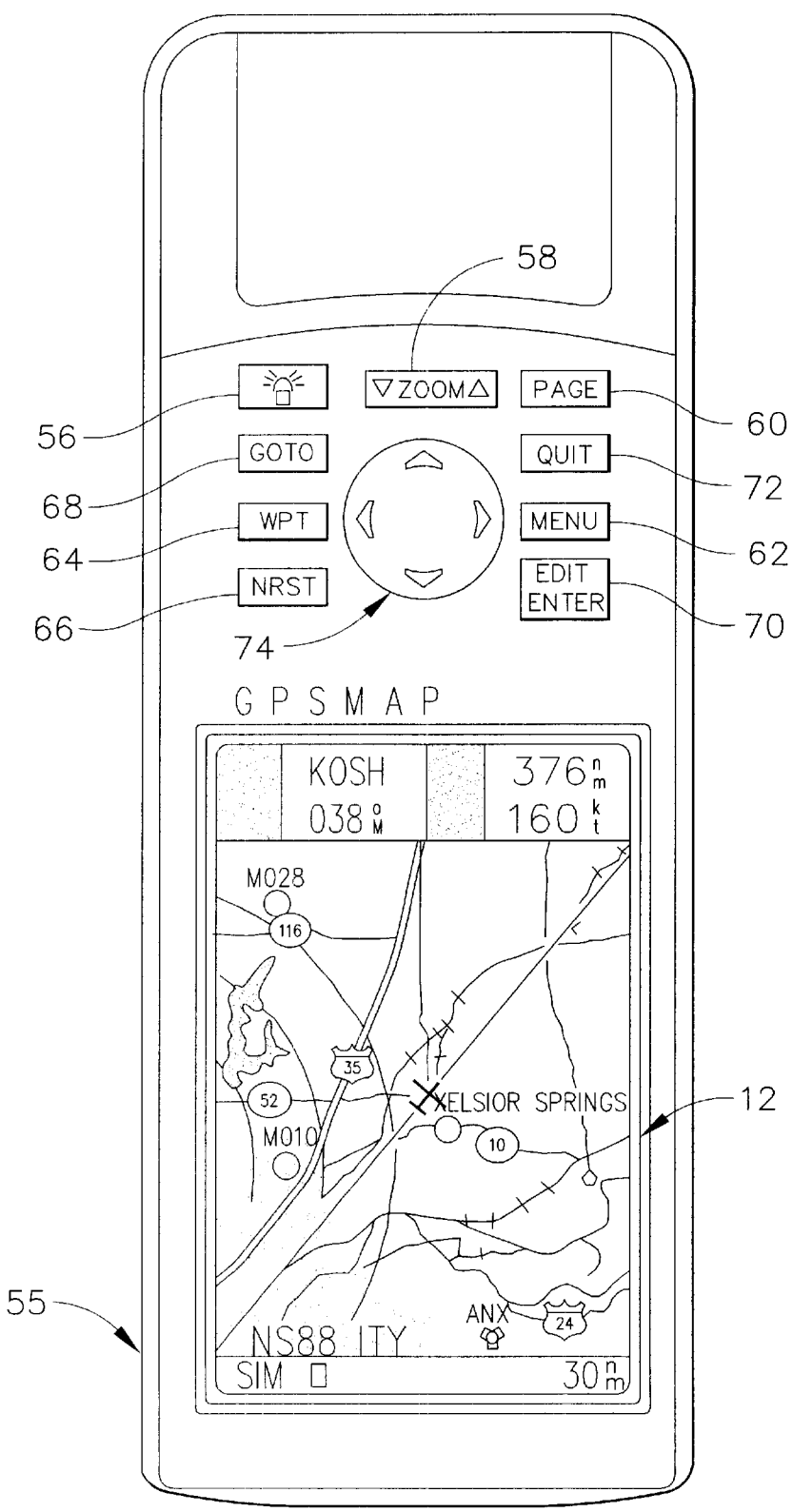
FIG. 4 is a plane view of a moving map display that can be incorporated into the yoke assembly of the present invention.

FIG. 4 illustrates a typical configuration of display assembly 10. In FIG. 4, display assembly 10 is housed in housing 55 which includes display screen 12 and a minimum number of function control keys 22. FIG. 4 illustrates typical function controls available on display assembly 10. For example, in a GPS mode, display assembly 10 includes function control keys 56 for providing illumination, 58 for zooming the display, 60 for toggling between page displays, 62 for accessing a menu, 64 for programming a way point, 66 for displaying the nearest way point, 68 for accessing the "goto" function, 70 for entering data, 72 for quitting the current menu, and 74 for moving about on the display. The function control keys may be individual control keys or ones of multiple keys included in an integral key pad. The function controls are compatible with any of the various applications available on display assembly 10 and are preferably programmable, having particular preassigned functions depending upon the particular application currently executing on display assembly 10. The particular function associated with each of functional control keys 22 varies as display assembly 10 is toggled by the operator between different pre-programmed computer applications. When the application currently executing changes, for example, from displaying GPS information to displaying approach plate information, function control keys 22 take on functions relevant to current application.

The actual physical size of display assembly 10 varies from a minimum usable size depending upon the space available on control portion 52 of yoke assembly 54, which varies depending upon the aircraft. Actual size of display assembly 10 also depends upon the number of function control keys provided, which varies depending upon the number and specific applications programmed into display assembly 10. In a typical aircraft application, display assembly 10 is expected to be about the size of typical commercially available hand-held instrument, for example, a hand-held GPS unit, and about one-half (½) inch thick, and is expected to have a minimum of three function keys suitably sized for manual manipulations.

While preferred embodiments of the invention have been described, variations and modifications will be obvious to those of skill in the relevant art. For example, integration of display assembly 10 into a vehicle control portion is accomplished by forming housing 55 as an integral portion of control portion 52 during manufacture or as a separate fixedly or removably attached structure. As suggested, the invention also has applications to manually steered marine and land-based vehicles. For at least these reasons, the invention is to be interpreted in light of the claims and is not limited to the particular embodiments described herein.

What is claimed is:

1. A display assembly mounted on the movable portion of the steering control assembly of a steerable aircraft for receiving and displaying information from one or more external information systems, the combination comprising:

a navigation computer integrated with the movable portion of an aircraft steering control assembly and being rotationally fixed therewith, said navigation computer coupled to one or more external information systems located on the steerable vehicle for receiving information from the one or more external information systems;

one or more computer applications executable by said navigation computer, each said application generating an output signal in response to information received from one or more of the external information systems;

a visual display integrated with the steering control portion and being rotationally fixed therewith, said visual display coupled to said navigation computer and receiving said output signal; and a function control integrated with the control portion, said function control coupled to said navigation computer and causing said navigation computer to execute different ones of said computer applications.

2. The display assembly recited in claim 1, wherein at least one of said one or more computer applications is a pre-programmed computer program resident on said navigation computer.

3. The display assembly recited in claim 1, wherein said visual display is coupled interactively to said navigation computer.

4. The display assembly recited in claim 1, wherein said function control comprises a plurality of function control keys.

5. The display assembly recited in claim 4, wherein said each of said function control keys exhibits a programmable function compatible with each of said computer applications.

6. The display assembly recited in claim 1, wherein said function control comprises a pointing device.

7. The display assembly recited in claim 1, further comprising a memory device coupled to said navigation computer.

8. The display assembly recited in claim 6, wherein said memory device is a read-only memory device.

9. The display assembly recited in claim 1, further comprising a database of terrain information.

10. The display assembly recited in claim 1, further comprising one or more navigation sensors.

11. A display assembly for displaying information from one or more information systems, the display assembly being integrated with the rotatable steering control portion of a steerable vehicle and being limited to approximately plus and minus ninety degrees of rotation, the display assembly comprising:

one or more information systems generating information relevant to the status of the steerable vehicle, said one or more information systems including a flight computer, a plurality of on-board warning systems, and one or more navigation sensors;

a navigation computer coupled to one or more of said information systems for receiving said relevant information from one or more of said information systems and generating an output signal in response to said relevant information, said navigation computer forming an integral portion of a rotatable steering control portion that is limited to approximately plus and minus ninety degrees of rotation;

a plurality of function control keys forming an integral portion of the rotatable steering control portion and coupled to said navigation computer; and a display screen forming an integral portion of the rotatable steering control portion, said display screen coupled to said navigation computer for receiving said output signal and for displaying a visual representation related to said output signal.

12. The display assembly recited in claim 11 wherein said display screen is a display screen capable of dynamically displaying graphic and textual information.

13. The display assembly recited in claim 11 wherein said relevant information is processed by said navigation computer according to different computer program applications.

14. The display assembly recited in claim 12 wherein said function control keys comprise function control keys having programmable functions compatible with each of said computer program applications.

15. The display assembly recited in claim 11 further comprising one or more information databases coupled to said navigation computer.

16. The display assembly recited in claim 15 wherein one of said information databases is a terrain information database.

17. The display assembly recited in claim 11 further comprising said one or more navigation sensors forming an integral portion of the rotatable steering control portion and being coupled to said navigation computer.

18. A combination manually rotatable steering mechanism and display assembly mounted on the control system of a steerable aircraft for receiving and displaying information from one or more external information systems, the combination comprising:

a manually rotatable steering mechanism attached to a control system of the steerable aircraft for imparting control impulses to the control system of the steerable aircraft, said control impulses including tilting of said steering mechanism and rotating of said steering mechanism within a rotation limit of approximately ninety degrees;

a navigation computer coupled to one or more external information systems located on the steerable vehicle for receiving information from the one or more external information systems and integral navigation sensors, said navigation computer forming an integral portion of said manually rotatable steering mechanism;

one or more pre-programmed computer applications resident on said navigation computer, each said application generating an output signal in response to information received from one or more of the external information systems;

a display screen integral with said control portion and coupled to said navigation computer for receiving said output signal generated by ones of said computer applications, said display screen capable of dynamically displaying dynamic graphical and textual information;

one or more function controls integral with said control portion, said function controls comprising function control keys suitable for manual manipulation, said function control keys further having programmable functions compatible with each of said computer applications; and means for causing said navigation computer to execute different ones of said computer applications.

19. The combination steering mechanism and display assembly recited in claim 18 wherein said manually rotatable steering mechanism includes one or more gripping portions formed symmetrically about a central hub portion, said central hub portion being interconnected with the control system for imparting control impulses thereto.

20. The combination steering mechanism and display assembly recited in claim 19 further comprising one or more integral information systems coupled to said navigation computer.

21. The combination steering mechanism and display assembly recited in claim 20 wherein said at least one of said integral information systems coupled to said navigation computer is a terrain database.

22. A method of displaying information on an aircraft steering control mechanism, the method comprising:

receiving navigation information from an on-board information source via an aircraft data bus;

processing said information in a navigation computer integrated into a manually rotatable steering control portion of a vehicle control system, said steering control portion being limited in rotation to approximately ninety degrees;

displaying said information on a display integrated into the manually rotatable steering control portion.

* * * * *